US011693268B2

United States Patent
Mun et al.

(10) Patent No.: US 11,693,268 B2
(45) Date of Patent: Jul. 4, 2023

(54) DISPLAY DEVICE AND METHOD FOR MANUFACTURING THE SAME

(71) Applicant: Samsung Display Co., Ltd., Yongin-si (KR)

(72) Inventors: Eunjoong Mun, Seongnam-si (KR); Dong Yeon Lee, Anyang-si (KR); Hyung-Don Na, Seoul (KR); Jungkyu Jo, Hwaseong-si (KR); Hyeon Deuk Hwang, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/828,408

(22) Filed: May 31, 2022

(65) Prior Publication Data
US 2022/0291540 A1    Sep. 15, 2022

Related U.S. Application Data

(62) Division of application No. 16/833,667, filed on Mar. 30, 2020, now Pat. No. 11,372,273.

(30) Foreign Application Priority Data

Apr. 22, 2019    (KR) .................. 10-2019-0046643

(51) Int. Cl.
   *G02F 1/1333*    (2006.01)
   *G02B 1/14*      (2015.01)
   *G06F 1/16*      (2006.01)

(52) U.S. Cl.
   CPC ............. *G02F 1/1333* (2013.01); *G02B 1/14* (2015.01); *G02F 1/133308* (2013.01); *G06F 1/1609* (2013.01); *G06F 1/1652* (2013.01)

(58) Field of Classification Search
   None
   See application file for complete search history.

(56) References Cited

U.S. PATENT DOCUMENTS

| 2011/0187960 A1 | 8/2011 | Kobayashi et al. |
| 2014/0118902 A1 | 5/2014 | Kim |

(Continued)

FOREIGN PATENT DOCUMENTS

| CN | 109445171 A | 3/2019 |
| JP | 6135902 B2  | 5/2017 |

(Continued)

OTHER PUBLICATIONS

Extended European Search Report for Application No. 20168859.5 dated Jul. 28, 2020.

*Primary Examiner* — Shan Liu
(74) *Attorney, Agent, or Firm* — Cantor Colburn LLP

(57) ABSTRACT

A display device includes a display panel including a display area and a non-display area, a window disposed on the display panel and including a base substrate and a printed layer disposed on a surface of the base substrate and overlapping with the non-display area, and an adhesive layer disposed between the display panel and the window. The adhesive layer includes a first adhesive portion overlapping with the non-display area, and a second adhesive portion adjacent to the first adhesive portion and having a creep value different from a creep value of the first adhesive portion.

8 Claims, 11 Drawing Sheets

(56) References Cited

U.S. PATENT DOCUMENTS

| | | | |
|---|---|---|---|
| 2015/0355498 A1* | 12/2015 | Yoshida | G02F 1/133308 |
| | | | 349/110 |
| 2016/0250661 A1 | 9/2016 | Miller et al. | |
| 2017/0080680 A1 | 3/2017 | Lee et al. | |
| 2019/0129232 A1 | 5/2019 | Itagaki | |
| 2020/0292871 A1 | 9/2020 | Inoue et al. | |

FOREIGN PATENT DOCUMENTS

| | | |
|---|---|---|
| KR | 1020140052732 A | 5/2014 |
| KR | 1020170072526 A | 6/2017 |
| KR | 1020170080257 A | 7/2017 |
| KR | 101765449 B1 | 8/2017 |

\* cited by examiner

DISPLAY DEVICE AND METHOD FOR MANUFACTURING THE SAME

This application is a divisional of U.S. patent application Ser. No. 16/833,667, filed on Mar. 30, 2020, which claims priority to Korean Patent Application No. 10-2019-0046643, filed on Apr. 22, 2019, and all the benefits accruing therefrom under 35 U.S.C. § 119, the content of which in its entirety is herein incorporated by reference.

BACKGROUND

1. Field

The disclosure herein relates to a display device and a method for manufacturing the same, and more particularly, to a display device including an adhesive layer coupling a display module and a window and a method for manufacturing the same.

Description of the Related Art

Various display devices are used to provide image information. A display device may include a display area and a non-display area. The display area may correspond to an active area, and a controller (e.g., a circuit board) for controlling the active area may be disposed in the non-display area.

SUMMARY

Recently, a flexible display device having a structure in which the non-display area is minimized or bent has been used to improve visibility and to reduce a dead space. However, the improvement of reliability of an adhesive member used to couple components of the display device may be desired to improve durability of the display device even though the dead space is reduced.

The disclosure may provide a display device which has improved reliability by an adhesive layer including adhesive portions having different mechanical properties from each other.

The disclosure may also provide a method for manufacturing a display device with improved reliability by providing an adhesive layer including adhesive portions having different mechanical properties from each other.

In an embodiment of the invention, a display device includes a display panel including a display area and a non-display area adjacent to the display area, a window disposed on the display panel, where the window includes a base substrate and a printed layer disposed on a surface of the base substrate and overlapping with the non-display area, and an adhesive layer disposed between the display panel and the window. In such an embodiment, the adhesive layer includes a first adhesive portion overlapping with the non-display area, and a second adhesive portion disposed adjacent to the first adhesive portion and having a creep value different from a creep value of the first adhesive portion.

In an embodiment, the first adhesive portion may have a modulus value different from a modulus value of the second adhesive portion.

In an embodiment, a width of the first adhesive portion from an edge of the adhesive layer in a plan view may be in a range from about 100 micrometers ($\mu$m) to about 700 $\mu$m.

In an embodiment, the first adhesive portion may overlap with the printed layer. In such an embodiment, the second adhesive portion may include a first sub-adhesive portion not overlapping with the printed layer, and a second sub-adhesive portion disposed between the first adhesive portion and the first sub-adhesive portion and overlapping with the printed layer.

In an embodiment, a width of the first adhesive portion and a width of the adhesive layer overlapping with the printed layer may satisfy the following inequality: $0.5 \leq W_1/W_2 < 1$, where $W_1$ denotes the width of the first adhesive portion, and $W_2$ denotes the width of the adhesive layer overlapping with the printed layer.

In an embodiment, a module hole may be defined in the display area of the display panel, and the window may further include a hole printed layer surrounding the module hole and disposed on the surface of the base substrate.

In an embodiment, the adhesive layer may further include a third adhesive portion surrounding the module hole and having a creep value from the creep value of the second adhesive portion.

In an embodiment, the third adhesive portion may have a modulus value different from a modulus value of the second adhesive portion.

In an embodiment, the third adhesive portion may overlap with a portion of the hole printed layer.

In an embodiment, the second adhesive portion may be adjacent to the third adhesive portion and may overlap with an edge of the hole printed layer.

In an embodiment, a width of the third adhesive portion and a width of the adhesive layer overlapping with the hole printed layer may satisfy the following inequality: $0.5 < W_{C1}/W_{C2} < 1$, where $W_{C1}$ denotes the width of the third adhesive portion, and $W_{C2}$ denotes the width of the adhesive layer overlapping with the hole printed layer.

In an embodiment of the invention, a method for manufacturing a display device includes forming a preliminary adhesive layer including a first preliminary adhesive portion having a first creep value and a second preliminary adhesive portion having a second creep value greater than the first creep value, adhering the preliminary adhesive layer to a display panel including a display area and a non-display area, adhering a window to the preliminary adhesive layer, and providing first ultraviolet light to the preliminary adhesive layer to form an adhesive layer.

In an embodiment, a ratio of the first creep value to the second creep value may be in a range from 0.1:1 to 0.5:1, and each of the first and second creep values may be a creep value obtained when a load of 2000 pascal (Pa) is maintained at 50 degrees Celsius for 10 minutes.

In an embodiment, the forming of the preliminary adhesive layer may include providing an adhesive coating layer including an adhesive composition, disposing a mask, over the adhesive coating layer, where the mask may include an edge transparent portion overlapping with the non-display area and a light blocking portion adjacent to the edge transparent portion, and irradiating second ultraviolet light to the adhesive coating layer through the mask.

In an embodiment, the first preliminary adhesive portion may correspond to the edge transparent portion of the mask, and the second preliminary adhesive portion may correspond to the light blocking portion of the mask.

In an embodiment, a module hole may be defined in the display area of the display panel, and the mask may further include a hole open portion corresponding to the module hole, and a hole transparent portion surrounding the hole open portion.

In an embodiment, the preliminary adhesive layer may further include a third preliminary adhesive portion corresponding to the hole transparent portion. In such an embodiment, a ratio of a third creep value of the third preliminary adhesive portion to the second creep value may be in a range from 0.1:1 to 0.5:1, and each of the second creep value and the third creep value may be a creep value obtained when a load of 2000 Pa is maintained at 50 degrees Celsius for 10 minutes.

In an embodiment, the forming the preliminary adhesive layer may include providing an adhesive coating layer including an adhesive composition, and irradiating second ultraviolet light to an edge of the adhesive coating layer.

In an embodiment, the adhesive layer may include a first adhesive portion provided from the first preliminary adhesive portion, and a second adhesive portion provided from the second preliminary adhesive portion.

In an embodiment, the first adhesive portion and the second adhesive portion may have different modulus values from each other.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
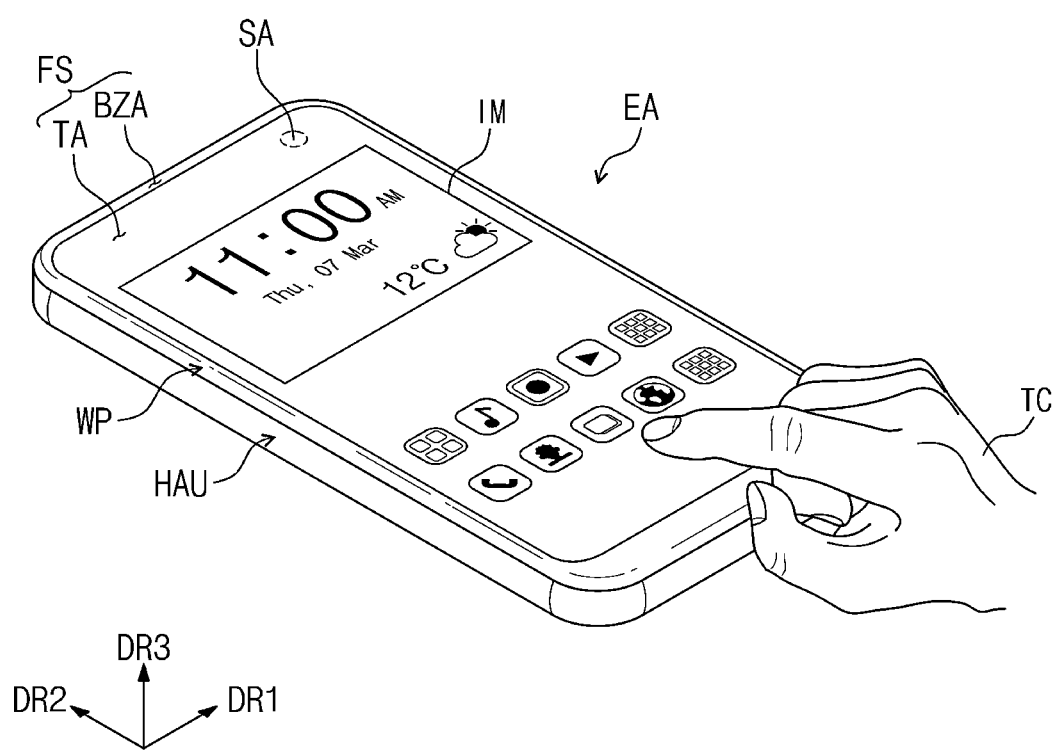
FIG. 1 is a perspective view illustrating a display device according to an embodiment of the invention.

The invention now will be described more fully hereinafter with reference to the accompanying drawings, in which various embodiments are shown. The invention may, however, be embodied in many different forms, and should not be construed as limited to the embodiments set forth herein. Rather, these embodiments are provided so that this disclosure will be thorough and complete, and will fully convey the scopes of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing.

For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

Figure 2:
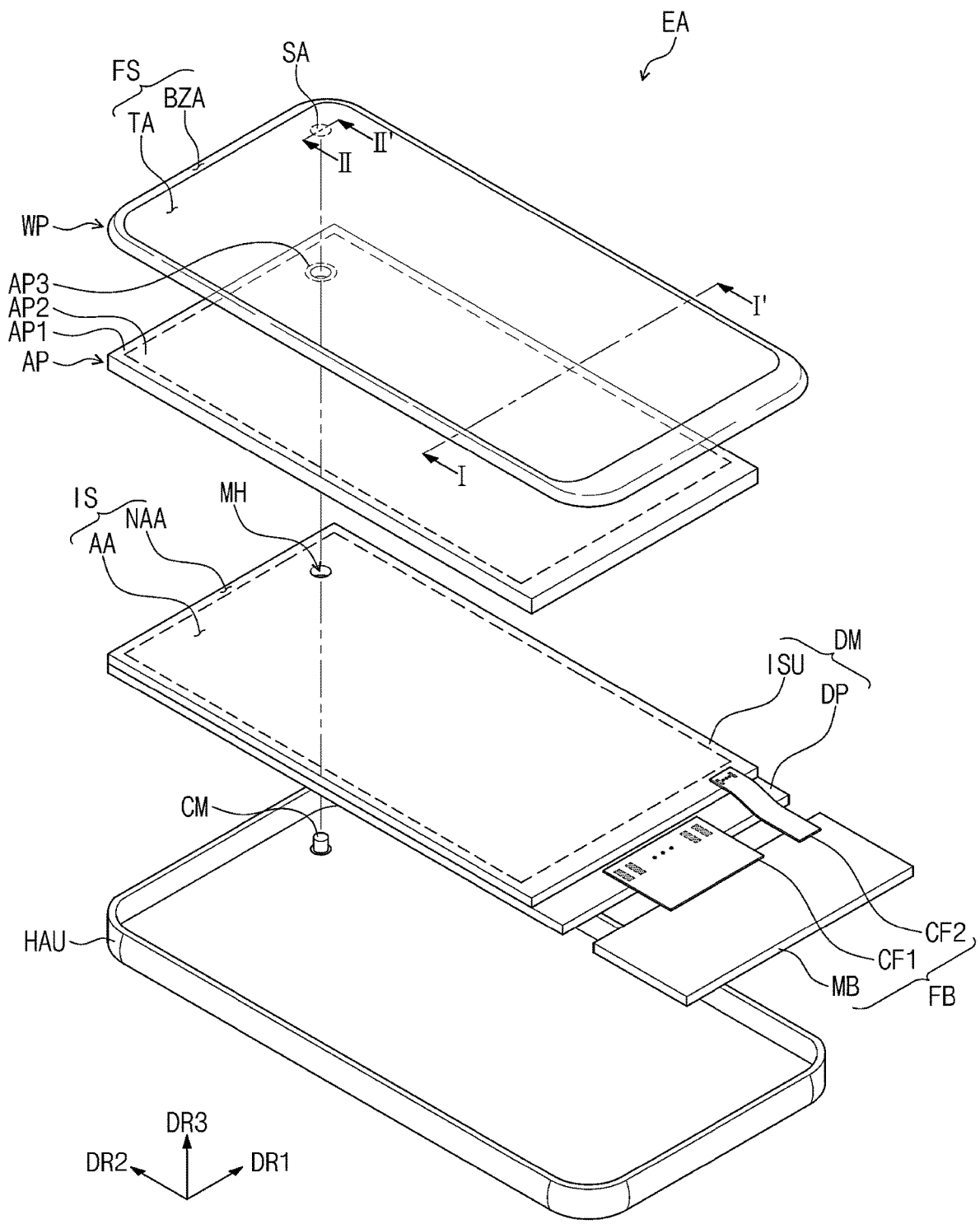
FIG. 2 is an exploded perspective view illustrating a display device according to an embodiment of the invention.
Figure 3:
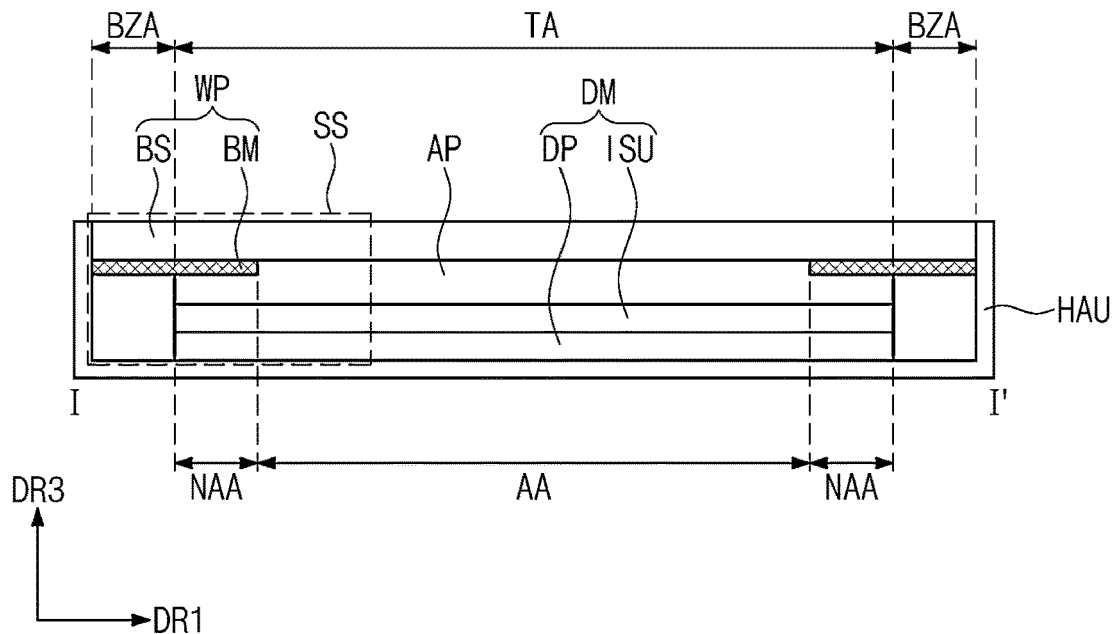
FIG. 3 is a cross-sectional view illustrating a display device according to an embodiment of the invention.
Figure 4:
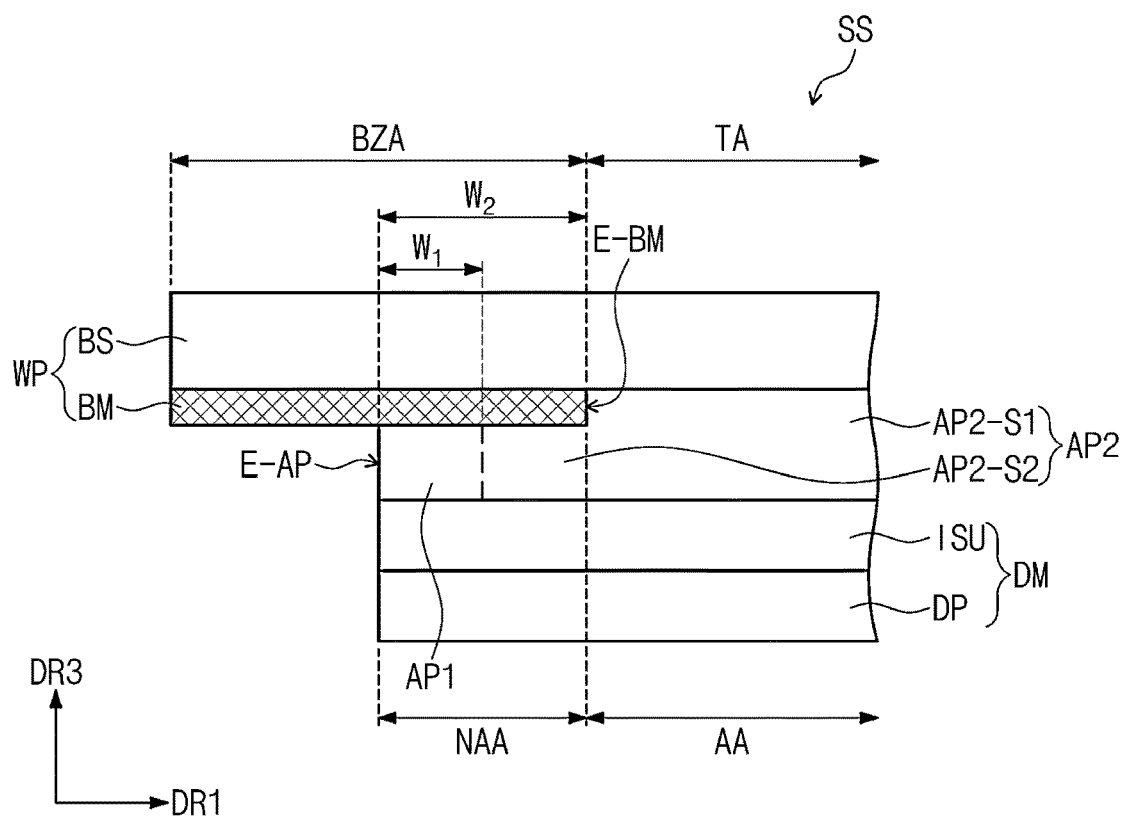
FIG. 4 is a cross-sectional view illustrating a portion of a display device according to an embodiment of the invention.
Figure 5:
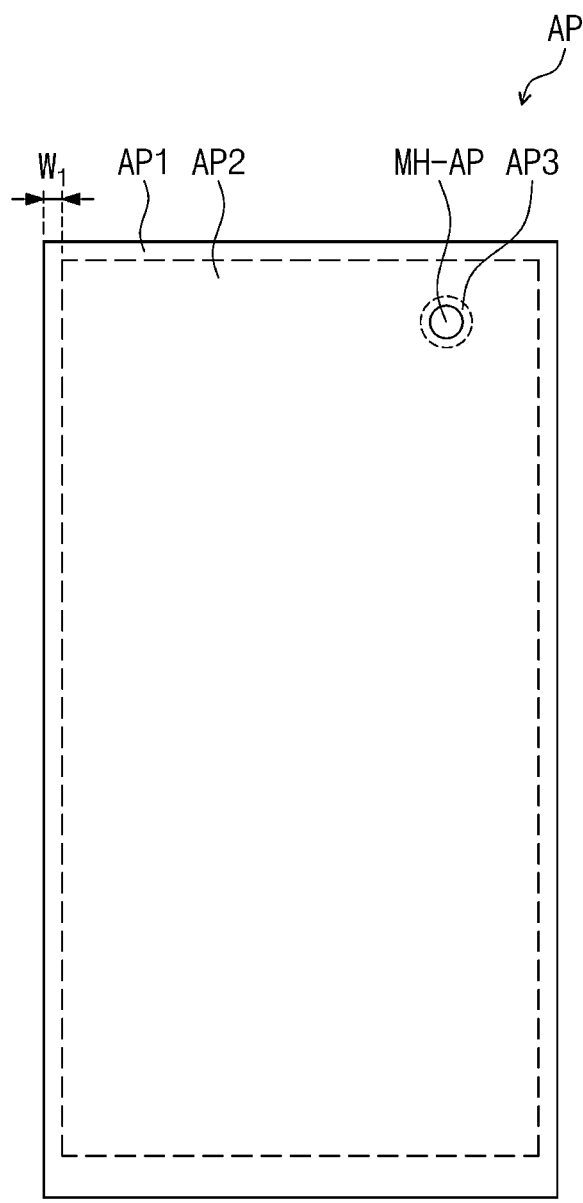
FIG. 5 is a plan view illustrating an adhesive layer according to an embodiment of the invention.
Figure 5:
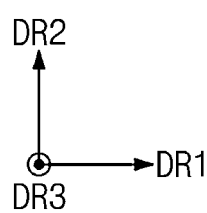
Figure 6:
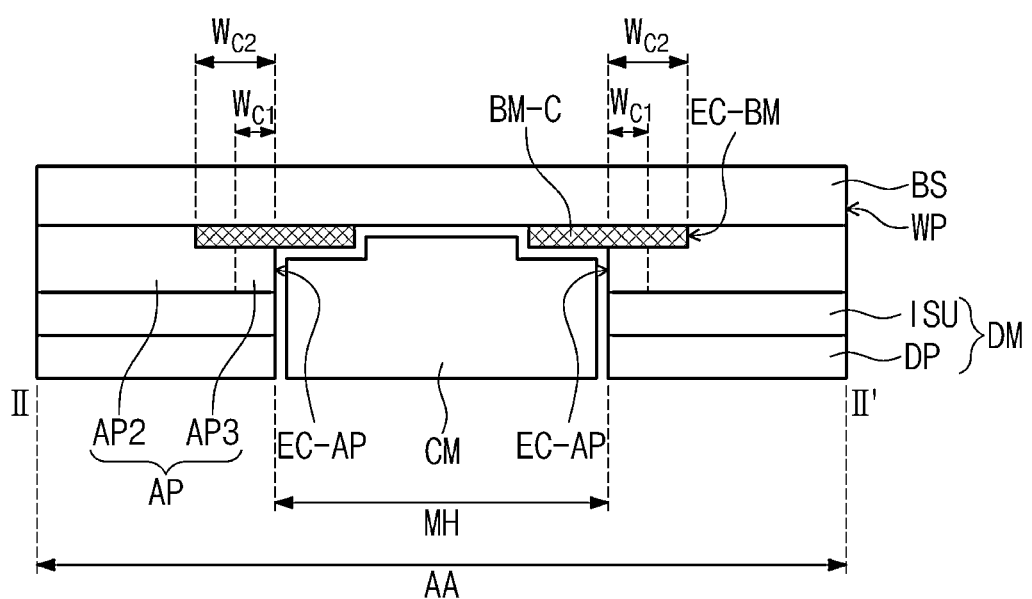
FIG. 6 is a cross-sectional view illustrating a portion of a display device according to an embodiment of the invention.

FIG. 1 is a perspective view illustrating a display device according to an embodiment of the invention. FIG. 2 is an exploded perspective view illustrating a display device according to an embodiment of the invention. FIG. 3 is a cross-sectional view illustrating a display device according to an embodiment of the invention, and FIG. 4 is a cross-sectional view illustrating a portion of a display device according to an embodiment of the invention. More particularly, FIG. 3 is a cross-sectional view taken along line I-I' of FIG. 2, and FIG. 4 is an enlarged cross-sectional view corresponding to an area "SS" of FIG. 3. FIG. 5 is a plan view illustrating an adhesive layer according to an embodiment of the invention. FIG. 6 is a cross-sectional view illustrating a portion of a display device according to an embodiment of the invention.

An embodiment of a display device EA may be activated by an electrical signal. The display device EA may be applied to or used as at least one of various devices, for example, the display device EA may be applied to a personal computer, a notebook computer, a personal digital assistant ("PDA"), a car navigation unit, a game console, a smart phone, a tablet, or a camera. However, these are provided only as embodiments of the invention. In an embodiment, the display device EA may be used in other various devices without departing from the spirits and scopes of the invention. In an embodiment, the display device EA may be a smart phone, as shown in FIG. 1.

Here, first to third directional axes DR1, DR2 and DR3 are illustrated in FIG. 1 and other drawings, but directions indicated by the first to third directional axes DR1, DR2 and DR3 may be relative concepts and may be changed into other directions.

For the purpose of ease and convenience in description, the direction of the third directional axis DR3 may be defined as a direction in which an image is provided to a user. The first directional axis DR1 and the second directional axis DR2 may be perpendicular to each other, and the third directional axis DR3 may indicate a normal direction with respect to a plane defined by the first directional axis DR1 and the second directional axis DR2. The third directional axis DR3 may be a thickness direction of the display device EA.

An embodiment of the display device EA may include a display module DM, a driving circuit unit FB, a window WP, an adhesive layer AP, an electronic module CM, and a housing HAU. The display module DM may include a display panel DP and an input sensing unit ISU. In an embodiment, the window WP and the housing HAU may be coupled to each other to form the exterior of the display device EA. In an embodiment of the display device EA, the adhesive layer AP may be disposed between the display module DM and the window WP to couple the display module DM and the window WP to each other.

The display device EA may display an image IM on a display surface FS, which is parallel to the plane defined by the first and second directional axes DR1 and DR2, in the direction of the third directional axis DR3. The display surface FS, on which the image IM is displayed, may correspond to a front surface of the display device EA and may correspond to a front surface of the window WP. Hereinafter, the display surface and the front surface of the display device EA and the front surface of the window WP will be indicated by the same reference designator. The image IM may include a static image as well as a dynamic image. In an embodiment, as shown in FIG. 1, the image IM may include a time display box and application icons, for example.

In an embodiment of the display device EA, as shown in FIG. 3, the window WP may include an optically transparent insulating material. The window WP may include a base substrate BS and a printed layer BM.

The window WP may include a transmission area TA and a bezel area BZA. The front surface FS of the window WP which includes the transmission area TA and the bezel area BZA may correspond to or define the front surface FS of the display device EA. A user may view an image provided through the transmission area TA corresponding to the front surface FS of the display device EA.

In an embodiment, as shown in FIG. 1, the transmission area TA has a quadrilateral (or rectangular) shape of which corners are rounded. However, embodiments of the invention are not limited thereto. In alternative embodiments, the shape of the transmission area TA may be variously modified.

The transmission area TA may be optically transparent. A light transmittance of the bezel area BZA may be less than a light transmittance of the transmission area TA. The bezel area BZA may have a predetermined color. The bezel area BZA may be adjacent to the transmission area TA and may surround the transmission area TA in a plan view. The bezel area BZA may define the shape of the transmission area TA. However, embodiments of the invention are not limited thereto. In alternative embodiments, the bezel area BZA may be adjacent to only one side of the transmission area TA, or a portion of the bezel area BZA may be omitted.

The base substrate BS may be a glass or plastic substrate. In one embodiment, for example, the base substrate BS may be a tempered glass substrate. Alternatively, the base substrate BS may be formed of a polymer resin having flexibility. In one embodiment, for example, the base substrate BS may include or be formed of polyimide, polyacrylate, polymethylmethacrylate, polycarbonate, polyethylenenaphthalate, polyvinylidene chloride, polyvinylidene difluoride, polystyrene, ethylene vinylalcohol copolymer, or a combination thereof. However, embodiments of the invention are not limited thereto. The base substrate BS of the window WP may include or be formed of at least one of other various materials known in the art.

The printed layer BM may be disposed on a surface of the base substrate BS. In an embodiment, the printed layer BM may be disposed or provided on a bottom surface of the base substrate BS, which is adjacent to the display module DM. The printed layer BM may be disposed on an edge area of the base substrate BS. The printed layer BM may be an ink printed layer. The printed layer BM may include a pigment or a dye.

The printed layer BM may include shielding ink for blocking light. In one embodiment, for example, the printed layer BM may include a base material and the shielding ink. The shielding ink may include carbon black particles. However, embodiments of the invention are not limited thereto. In alternative embodiments, the shielding ink may include one or more kinds of known pigments, one or more kinds of known dyes, or a mixture thereof. The printed layer BM may effectively prevent components in the display device EA from being visible to the outside.

In the window WP, the bezel area BZA may be a portion in which the printed layer BM is provided.

In an embodiment, the window WP may further include at least one functional layer (not shown) provided on the base substrate BS. In one embodiment, for example, the functional layer (not shown) may include a hard coating layer and/or an anti-fingerprint coating layer. However, embodiments of the invention are not limited thereto.

In an embodiment, the window WP may include a sensing area SA. The sensing area SA may overlap with the electronic module CM to be described later in detail. The display device EA may receive an external signal for the electronic module CM through the sensing area SA and/or may provide a signal outputted from the electronic module CM to the outside through the sensing area SA. In an embodiment of the display device EA, the sensing area SA may be defined to overlap with the transmission area TA. In such an embodiment, the sensing area SA may be defined in the transmission area TA, and thus an additional area for providing the sensing area SA in an area outside the transmission area TA may be omitted. As a result, an area (or size) of the bezel area BZA may be reduced.

In an embodiment, as shown in FIGS. 1 and 2, the window WP may include a single sensing area SA. However, embodiments of the invention are not limited thereto. In alternative embodiments, the sensing area SA may be provided in plurality. In an embodiment, the sensing area SA is defined at the top right of the transmission area TA in FIG. 2. Alternatively, the sensing area SA may be defined at one of other various positions such as the top left, the central portion, the bottom left and the bottom right of the transmission area TA.

The display module DM may be disposed under the window WP. The term 'under' used herein may mean a direction opposite to the direction in which the display module DM provides an image. The display module DM may display the image IM and may sense an external input TC, e.g., a touch thereon by a finger or a pen for example. The display module DM may include a display surface IS including a display area AA and a non-display area NAA. The display area AA may be an area that is activated by an electrical signal.

In an embodiment, the display area AA may be an area in which the image IM is displayed and may also be an area in which the external input TC is sensed. The transmission area TA may overlap with the display area AA when viewed in a plan view or from a plan view in the third direction DR3. In one embodiment, for example, the transmission area TA may overlap with the whole or at least a portion of the display area AA. Thus, a user may view the image IM through the transmission area TA and/or may provide the external input TC through the transmission area TA.

The non-display area NAA may be covered by the bezel area BZA. The non-display area NAA may be adjacent to the display area AA. The non-display area NAA may surround the display area AA when viewed in a plan view. A driving circuit and/or driving lines for driving the display area AA may be disposed in the non-display area NAA.

In an embodiment of the display device EA, the display module DM may be assembled in a flat state where the display area AA and the non-display area NAA face the window WP. However, embodiments of the invention are not limited thereto. In an alternative embodiment, a portion of the non-display area NAA may be bent. In such an embodiment, a portion of the non-display area NAA may face a rear surface of the display device EA, and thus an area (or size) of the bezel area BZA in the front surface of the display device EA may be reduced. In another alternative embodiment, the display module DM may be assembled in a state where a portion of the display area AA is also bent. In another alternative embodiment, the non-display area NAA may be omitted in the display module DM.

The display module DM may include the display panel DP and the input sensing unit ISU, as described above.

The display panel DP may be a component which substantially generates the image IM. The image IM generated from the display panel DP may be displayed on the display surface IS and may be visible to a user through the transmission area TA.

In an embodiment of the display device EA, the display panel DP may be a liquid crystal display panel or a light emitting display panel. In one embodiment, for example, the display panel DP may be a liquid crystal display panel including a liquid crystal element, an organic light emitting display panel including an organic light emitting element, or a quantum-dot light emitting display panel including a quantum-dot light emitting element. However, embodiments of the invention are not limited thereto. The display panel DP may include a display area AA and a non-display area NAA. In an embodiment, the liquid crystal element, the organic light emitting element or the quantum-dot light emitting element may be disposed in the display area AA of the display panel DP.

The input sensing unit ISU may sense the external input TC applied from the outside. In one embodiment, for example, the input sensing unit ISU may sense the external input TC provided to the window WP. The external input TC may be a user's input. The user's input may include at least one of various external inputs such as a touch by a part (e.g., a finger) of a user's body, light, heat, a pen, and pressure. In an embodiment, as shown in FIG. 1, the external input TC may be a touch by a user's hand on the front surface FS, for example. However, embodiments of the invention are not limited thereto. In embodiments, the external input TC may be provided in various forms, as described above. In alternative embodiments, the display device EA may also sense the external input TC applied to a side surface and/or a rear surface of the display device EA, on the basis of a structure of the display device EA. The input sensing unit ISU may be disposed on the display panel DP.

The driving circuit unit FB may be electrically connected to the display panel DP and the input sensing unit ISU. The driving circuit unit FB may include a main circuit board MB, a first flexible film CF1, and a second flexible film CF2.

The first flexible film CF1 may be electrically connected to the display panel DP. The first flexible film CF1 may connect the display panel DP and the main circuit board MB. The first flexible film CF1 may be connected to pads (display pads) of the display panel DP, which are disposed in the non-display area NAA. The first flexible film CF1 may provide electrical signals for driving the display panel DP to the display panel DP. The electrical signals may be generated in the first flexible film CF1 or may be generated in the main circuit board MB.

The second flexible film CF2 may be electrically connected to the input sensing unit ISU. The second flexible film CF2 may connect the input sensing unit ISU and the main circuit board MB. The second flexible film CF2 may be connected to pads (sensing pads) of the input sensing unit ISU, which are disposed in the non-display area NAA. The second flexible film CF2 may provide electrical signals for driving the input sensing unit ISU to the input sensing unit ISU. The electrical signals may be generated in the second flexible film CF2 or may be generated in the main circuit board MB.

The main circuit board MB may include various kinds of driving circuits for driving the display module DM and/or a connector for supplying power. The first flexible film CF1 and the second flexible film CF2 may be connected to the main circuit board MB. According to an embodiment of the invention, the display module DM may be easily controlled through a single main circuit board MB. However, embodiments of the invention are not limited thereto. In alternative embodiments, the display panel DP and the input sensing unit ISU of the display module DM may be connected to different main circuit boards, or one of the first and second flexible films CF1 and CF2 may not be connected to the main circuit board MB.

In an embodiment, an area of the display module DM which corresponds to the sensing area SA may have a transmittance higher than a transmittance of the display area AA not overlapping with the sensing area SA. In one embodiment, for example, at least a portion of components of the display panel DP and the input sensing unit ISU in the area overlapping with the sensing area SA may be removed. Thus, the electronic module CM overlapping with the sensing area SA may easily transmit and/or receive a signal through the sensing area SA.

In one embodiment, for example, a hole MH (hereinafter, referred to as a module hole MH) may be defined in the area of the display module DM corresponding to the sensing area SA, as illustrated in FIG. 2. The module hole MH may be defined in the display area AA and may be defined through the display module DM. The module hole MH may be defined to penetrate the display panel DP and the input sensing unit ISU. The module hole MH may overlap with the sensing area SA and may be defined by removing components of the display panel DP and components of the input sensing unit ISU. Since the module hole MH is defined in the display area AA, the sensing area SA may be provided in the transmission area TA.

In an embodiment, referring to FIG. 5, an adhesive layer hole MH-AP overlapping with the module hole MH may be defined in the adhesive layer AP. The adhesive layer hole MH-AP may be defined or formed by removing a portion of the adhesive layer AP.

The electronic module CM may overlap with the module hole MH and the sensing area SA when viewed in a plan view. The electronic module CM may be disposed under the display module DM. In an embodiment, at least a portion of the electronic module CM may be received or disposed in the module hole MK The electronic module CM may receive an external input transmitted through the sensing area SA and/or may provide an output signal through the sensing area SA.

In one embodiment, for example, the electronic module CM may include a sound output module, a light emitting module, a light receiving module, and/or a camera module. The electronic module CM may be mounted on an additional board and may be electrically connected to the display module DM through a connector (not shown).

The sound output module may convert sound data received from the outside or sound data stored in a memory of the display device EA and may output the converted sound data to the outside. The light emitting module may generate light and may output the generated light. In one embodiment, for example, the light emitting module may output infrared light. The light receiving module may sense infrared light. The light receiving module may be activated when sensing the infrared light of a predetermined level or more. After the infrared light generated from the light emitting module is outputted, the infrared light may be reflected by an external object (e.g., a user's finger or face), and then, the reflected infrared light may be incident to the light receiving module. The camera module may obtain an external image. In embodiments, the electronic module CM may include a plurality of modules. However, the invention are not limited to a specific embodiment.

In an embodiment of the display device EA, the housing HAU may be coupled to the window WP. The housing HAU and the window WP may be coupled to each other to provide an inner space. The display module DM and the electronic module CM may be received or disposed in the inner space provided by the housing HAU.

The housing HAU may include or be formed of a material having relatively high rigidity. In one embodiment, for example, the housing HAU may include a plurality of frames and/or plates formed of glass, plastic, a metal, or a combination thereof. The housing HAU may stably protect the components of the display device EA received in the inner space from an external impact.

In an embodiment of the display device EA, the adhesive layer AP may be disposed between the display module DM and the window WP. The adhesive layer AP may be disposed between the display module DM and the window WP to couple the display module DM and the window WP to each other.

The adhesive layer AP may be an optically clear adhesive ("OCA") layer. The adhesive layer AP may include at least one of an acrylic-based adhesive, a silicon-based adhesive and a urethane-based adhesive. The adhesive layer AP may further include inorganic particles. In one embodiment, for example, the adhesive layer AP may further include the inorganic particles formed of $SiO_2$ or $TiO_2$, and thus strength of the adhesive layer AP may be improved.

The adhesive layer AP may include a first adhesive portion AP1 overlapping with the non-display area NAA and a second adhesive portion AP2 adjacent to the first adhesive portion AP1. In an embodiment, the first adhesive portion AP1 may surround the second adhesive portion AP2 when viewed in a plan view. In such an embodiment, the first adhesive portion AP1 may correspond to an outer portion of the adhesive layer AP in a plan view, and an edge E-AP of the adhesive layer AP may correspond to an edge of the first adhesive portion AP1.

The second adhesive portion AP2 may overlap with the display area AA. The second adhesive portion AP2 may also overlap with a portion of the non-display area NAA.

The first adhesive portion AP1 may have a first creep value, the second adhesive portion AP2 may have a second creep value, and the first creep value may be different from the second creep value. Herein, the creep value of the adhesive layer AP may mean a creep value obtained when a load of 2000 pascal (Pa) is maintained at 50 degrees Celsius for 10 minutes.

In an embodiment, the first adhesive portion AP1 and the second adhesive portion AP2 may have different modulus values from each other. In one embodiment, for example, a degree of crosslinking of an adhesive resin included in the first adhesive portion AP1 may be different from a degree of crosslinking of an adhesive resin included in the second adhesive portion AP2. Herein, the modulus value may mean an elastic modulus.

In an embodiment, the first adhesive portion AP1 provided or formed from a first preliminary adhesive portion P-AP1 (see FIG. 10A) to be described later and the second adhesive portion AP2 provided or formed from a second preliminary adhesive portion P-AP2 (see FIG. 10A) to be described later may be manufactured under different ultraviolet irradiation conditions and thus may have different physical property values from each other.

In an embodiment, the first adhesive portion AP1 adjacent to the edge E-AP of the adhesive layer AP exposed to the outside may be provided or formed from the first preliminary adhesive portion P-AP1 (see FIG. 10A) having a smaller creep value and a higher modulus value than the second preliminary adhesive portion P-AP2 (see FIG. 10A) in a manufacturing process, and thus the first adhesive portion AP1 may block a void (e.g., gas or air) permeation from the edge E-AP of the adhesive layer AP.

In an embodiment, the second adhesive portion AP2 may include a first sub-adhesive portion AP2-S1 overlapping with the display area AA and a second sub-adhesive portion AP2-S2 overlapping with the non-display area NAA. The second sub-adhesive portion AP2-S2 may be adjacent to the first adhesive portion AP1. The second sub-adhesive portion AP2-S2 may be disposed between the first adhesive portion AP1 and the first sub-adhesive portion AP2-S1. The first adhesive portion AP1 and the second sub-adhesive portion AP2-S2 may overlap with the printed layer BM of the window WP. An edge E-BM of the printed layer BM may overlap with the second adhesive portion AP2.

The first sub-adhesive portion AP2-S1 and the second sub-adhesive portion AP2-S2 may be provided or formed from the second preliminary adhesive portion P-AP2 (see FIG. 10A) having a large creep value and a lower modulus value than the first preliminary adhesive portion P-AP1 (see FIG. 10A), and thus the first and second sub-adhesive portions AP2-S1 and AP2-S2 may effectively cover a step difference of the edge E-BM of the printed layer BM.

In an embodiment, the first adhesive portion AP1 of the adhesive layer AP, which is exposed at the edge E-AP, may be provided or formed from the preliminary adhesive portion having a high hardness to inhibit or prevent a void (e.g., gas or air) from permeating from the outside of the adhesive layer AP into the inside of the adhesive layer AP, an interface between the adhesive layer AP and the window WP, and/or an interface between the adhesive layer AP and the display module DM. In such an embodiment, the first adhesive portion AP1 may be manufactured from the preliminary adhesive portion having a relatively high hardness in the manufacturing process, and thus a mechanical property of the adhesive layer AP adjacent to the edge E-AP may be improved. As a result, adhesive strength between the adhesive layer AP and the window WP and between the adhesive layer AP and the display module DM may be increased to realize the display device EA with excellent reliability.

Referring to FIGS. 4 and 5, a width $W_1$ of the first adhesive portion AP1 may be defined as a width from the edge E-AP of the adhesive layer AP to an end adjacent to the second sub-adhesive portion AP2-S2. The width $W_1$ of the first adhesive portion AP1 may be in a range from about 100 micrometers (μm) to about 700 μm. If the width $W_1$ of the first adhesive portion AP1 is less than 100 μm, a void (e.g., gas or air) permeation from the outside may not be effectively blocked. If the width $W_1$ of the first adhesive portion AP1 is greater than 700 μm, a step difference caused by the printed layer BM may not be effectively covered or planarized.

Herein, a width of the adhesive portion or adhesive layer means a minimum width in a direction parallel to the first directional axis DR1 in a cross-sectional view parallel to a plane defined by the first directional axis DR1 and the third directional axis DR3.

The width $W_1$ of the first adhesive portion AP1 and a total width $W_2$ of the adhesive layer AP overlapping with the printed layer BM may satisfy the following inequality: $0.5 \leq W_1/W_2 < 1$.

The width $W_2$ of the adhesive layer AP overlapping with the printed layer BM may correspond to a width from the edge E-AP of the adhesive layer AP to an end of the second sub-adhesive portion AP2-S2 adjacent to the first sub-adhesive portion AP2-S1. In an embodiment, the width $W_2$ of the adhesive layer AP overlapping with the printed layer BM may be a sum of the width $W_1$ of the first adhesive portion AP1 and a width of the second sub-adhesive portion AP2-S2. The width $W_1$ of the first adhesive portion AP1 may be a width from the edge E-AP of the adhesive layer AP.

In such an embodiment, the width $W_1$ of the first adhesive portion AP1 may be less than the width $W_2$ of the adhesive layer AP overlapping with the printed layer BM. The width $W_1$ of the first adhesive portion AP1 may be equal to or greater than about 50% of the width $W_2$ of the adhesive layer AP overlapping with the printed layer BM. In one embodiment, for example, the width $W_1$ of the first adhesive portion AP1 may be equal to or greater than about 50% of a width of the printed layer BM overlapping with the adhesive layer AP and may be less than the width of the printed layer BM overlapping with the adhesive layer AP.

If a ratio of the width $W_1$ of the first adhesive portion AP1 to the width $W_2$ of the adhesive layer AP overlapping with the printed layer BM is less than 0.5, a void (e.g., gas or air) permeation from the outside may not be effectively blocked. If the ratio of the width $W_1$ of the first adhesive portion AP1 to the width $W_2$ of the adhesive layer AP overlapping with the printed layer BM is greater than 1 a step difference caused by the printed layer BM may not be effectively covered or planarized. The second adhesive portion AP2 provided or formed from the preliminary adhesive portion having a relatively low modulus value may cover (or effectively planarize) the step difference. Thus, if the ratio of the width $W_1$ of the first adhesive portion AP1 to the width $W_2$ of the adhesive layer AP overlapping with the printed layer BM is greater than 1, the second adhesive portion AP2 may not sufficiently cover the step difference of the printed layer BM, and thus an adhesive property may be deteriorated.

FIG. 6 is a cross-sectional view taken along line II-IF of FIG. 2 to illustrate a portion of a display device according to an embodiment of the invention. Referring to FIG. 6, in an embodiment of the display device EA, the adhesive layer AP may further include a third adhesive portion AP3. The third adhesive portion AP3 may be a portion surrounding the module hole MH.

In an embodiment, as described above with reference to FIGS. 1 and 2, the module hole MH may be defined in the display area AA of the display module DM. The module hole MH may be formed by removing portions of the adhesive layer AP, the input sensing unit ISU and the display panel DP. The electronic module CM may be inserted in the module hole MH.

In an embodiment, the window WP may further include a hole printed layer BM-C surrounding the module hole MH. The hole printed layer BM-C may surround the module hole MH and may be disposed on a surface of the base substrate BS. In one embodiment, for example, the hole printed layer BM-C may be disposed on the bottom surface of the base substrate BS, which is adjacent to the display module DM.

In an embodiment, as shown in FIG. 6, the hole printed layer BM-C may extend to the module hole MH, and thus a portion of the hole printed layer BM-C may overlap with the module hole MH. However, embodiments of the invention are not limited thereto. In an alternative embodiment, the hole printed layer BM-C may not overlap with the module hole MH.

The third adhesive portion AP3 may be adjacent to the second adhesive portion AP2, and an edge EC-AP of the third adhesive portion AP3 may be exposed to the module hole MH. The third adhesive portion AP3 may overlap with at least a portion of the hole printed layer BM-C. The second adhesive portion AP2 may overlap with an edge EC-BM of the hole printed layer BM-C.

In an embodiment, a creep value of the third adhesive portion AP3 may be different from the creep value of the second adhesive portion AP2. In such an embodiment, a modulus value of the third adhesive portion AP3 may be different from the modulus value of the second adhesive portion AP2. In one embodiment, for example, a degree of crosslinking of an adhesive resin included in the third adhesive portion AP3 may be different from the degree of crosslinking of the adhesive resin included in the second adhesive portion AP2.

In such an embodiment, the third adhesive portion AP3 provided or formed from a third preliminary adhesive portion P-AP3 (see FIG. 10A) to be described later and the second adhesive portion AP2 provided or formed from the second preliminary adhesive portion P-AP2 (see FIG. 10A) may be manufactured under different ultraviolet irradiation conditions and thus may have different physical property values.

The third adhesive portion AP3 adjacent to the edge EC-AP of the adhesive layer AP exposed to the module hole MH may be provided or formed from the third preliminary adhesive portion P-AP3 (see FIG. 10A) having a smaller creep value and a higher modulus value than the second preliminary adhesive portion P-AP2 (see FIG. 10A) in a manufacturing process, and thus the third adhesive portion AP3 may block a void (e.g., gas or air) permeating from the edge EC-AP of the adhesive layer AP.

In such an embodiment, the second adhesive portion AP2 provided or formed from the second preliminary adhesive portion P-AP2 (see FIG. 10A) having a relatively large creep value and a relatively low modulus value may overlap with the edge EC-BM of the hole printed layer BM-C and may effectively cover a step difference portion of the hole printed layer BM-C. Thus, a lifting phenomenon of the adhesive layer AP may be minimized.

In an embodiment, the third adhesive portion AP3 of the adhesive layer AP, which is exposed at the edge EC-AP, may be provided or formed from the preliminary adhesive portion having a high hardness to inhibit or prevent a void (e.g., gas or air) from permeating from the outside of the adhesive layer AP into the inside of the adhesive layer AP, an interface between the adhesive layer AP and the window WP, and/or an interface between the adhesive layer AP and the display module DM. In such an embodiment, the third adhesive portion AP3 may be manufactured from the preliminary adhesive portion having a relatively high hardness in the manufacturing process, and thus a mechanical property of the adhesive layer AP adjacent to the edge EC-AP may be improved. As a result, adhesive strength between the adhesive layer AP and the window WP and between the adhesive layer AP and the display module DM may be increased, and thus the display device EA may have improved reliability at the module hole MH.

In an embodiment, a width $W_{C1}$ of the third adhesive portion AP3 may be defined as a width from the edge EC-AP of the adhesive layer AP to an end adjacent to the second adhesive portion AP2. The width $W_{C1}$ of the third adhesive portion AP3 may be in a range from about 100 μm to about 700 μm. If the width $W_{C1}$ of the third adhesive portion AP3 is less than 100 μm, a void (e.g., gas or air) permeation from the outside may not be effectively blocked. If the width $W_{C1}$ of the third adhesive portion AP3 is greater than 700 μm, a step difference caused by the hole printed layer BM-C may not be effectively covered or planarized.

The width $W_{C1}$ of the third adhesive portion AP3 and a width $W_{C2}$ of the adhesive layer AP overlapping with the hole printed layer BM-C may satisfy the following inequality: $0.5 \leq W_{C1}/W_{C2} < 1$.

The width $W_{C2}$ of the adhesive layer AP overlapping with the hole printed layer BM-C may correspond to a width from the edge EC-AP of the adhesive layer AP exposed at the module hole MH to the edge EC-BM of the hole printed layer BM-C. In an embodiment, the width $W_{C2}$ of the adhesive layer AP overlapping with the hole printed layer BM-C may be a sum of the width $W_{C1}$ of the third adhesive portion AP3 and a width of the second adhesive portion AP2 overlapping with the hole printed layer BM-C. The width $W_{C1}$ of the third adhesive portion AP3 may be a width from the edge EC-AP of the adhesive layer AP.

In an embodiment, the width $W_{C1}$ of the third adhesive portion AP3 having a relatively high modulus value may be less than the width $W_{C2}$ of the adhesive layer AP overlapping with the hole printed layer BM-C. The width $W_{C1}$ of the third adhesive portion AP3 may be equal to or greater than about 50% of the width $W_{C2}$ of the adhesive layer AP overlapping with the hole printed layer BM-C.

If a ratio of the width $W_{C1}$ of the third adhesive portion AP3 to the width $W_{C2}$ of the adhesive layer AP overlapping with the hole printed layer BM-C is less than 0.5, a void (e.g., gas or air) permeation from the outside may not be effectively blocked. If the ratio of the width $W_{C1}$ of the third adhesive portion AP3 to the width $W_{C2}$ of the adhesive layer AP overlapping with the hole printed layer BM-C is greater than 1, a step difference caused by the hole printed layer BM-C may not be effectively covered or planarized. The second adhesive portion AP2 provided or formed from the preliminary adhesive portion having a relatively low modulus value may cover the step difference. Thus, if the ratio of the width $W_{C1}$ of the third adhesive portion AP3 to the width $W_{C2}$ of the adhesive layer AP overlapping with the hole printed layer BM-C is greater than 1, the second adhesive portion AP2 may not sufficiently cover the step difference of the hole printed layer BM-C, and thus an adhesive property may be deteriorated.

Figure 7A:
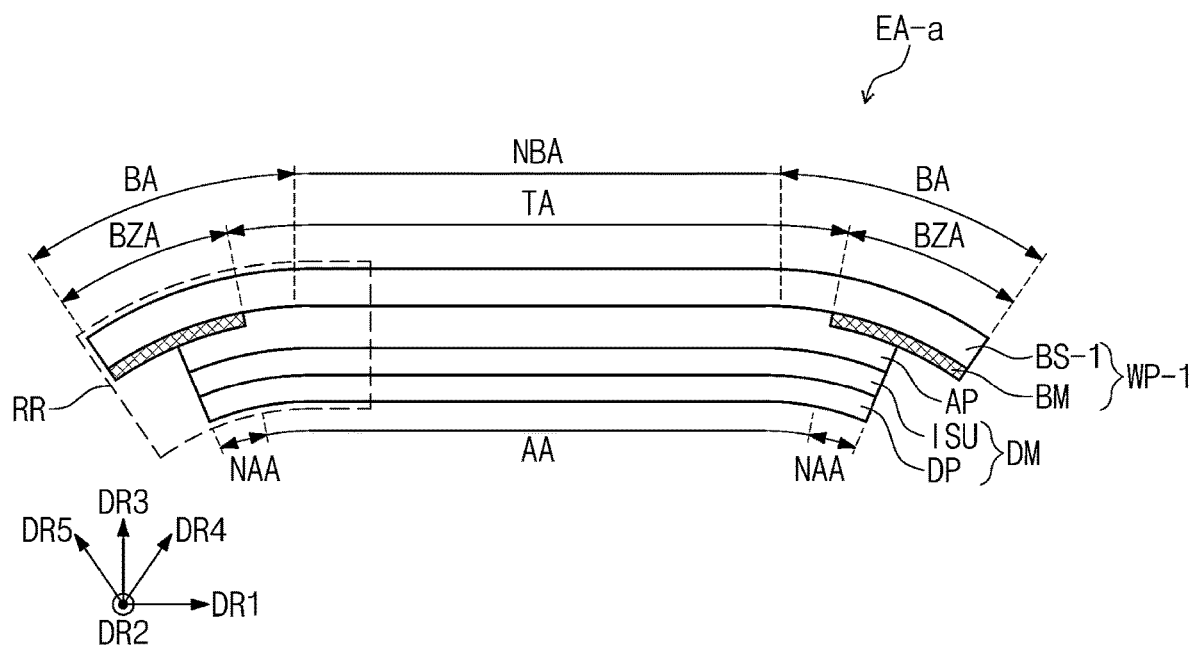
FIG. 7A is a cross-sectional view illustrating a display device according to an embodiment of the invention.
Figure 7B:
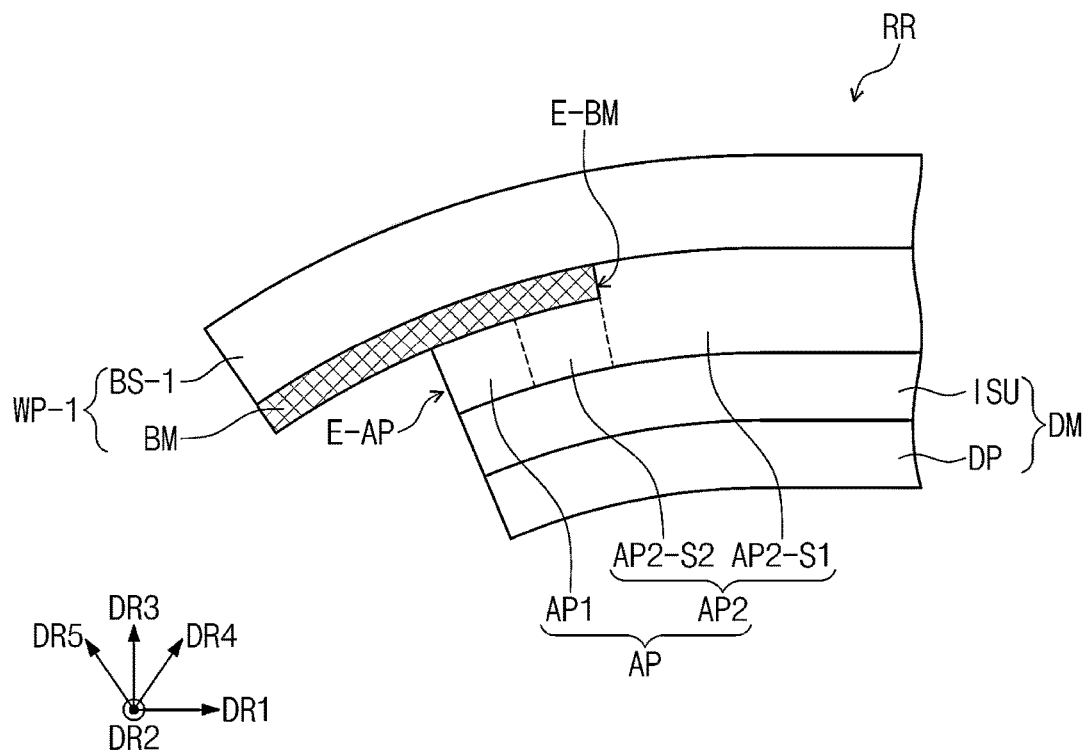
FIG. 7B is a cross-sectional view illustrating a portion of a display device according to an embodiment of the invention.

FIGS. 7A and 7B are cross-sectional views illustrating a display device according to an embodiment of the invention. FIG. 7B is an enlarged cross-sectional view of an area "RR" of FIG. 7A. Hereinafter, the descriptions to the same or like elements and features as in the embodiments described above with reference to FIGS. 1 to 6 will be omitted or simplified for the purpose of ease and convenience in description. In other words, differences between the embodiments of FIGS. 7A and 7B and the embodiments of FIGS. 1 to 6 will be mainly described.

Referring to FIGS. 7A and 7B, an embodiment of a display device EA-a may include a bending area BA. In an embodiment, the display device EA-a may include the bending area BA and a non-bending area NBA, and the bending area BA may be bent from a side of the non-bending area NBA.

Referring to FIGS. 7A and 7B, in an embodiment, the display device EA-a may include the non-bending area NBA in which the image IM (see FIG. 1) is displayed in a front direction, and the bending area BA in which the image IM (see FIG. 1) is displayed in a side direction. In FIG. 7A, two bending areas BA may be bent from both sides of the non-bending area NBA, respectively.

Referring to FIG. 7A, the non-bending area NBA may provide an image in the direction of the third directional axis DR3 corresponding to the front direction of the display device EA-a, and the bending areas BA may provide images in a direction of a fourth directional axis DR4 and a direction of a fifth directional axis DR5. The fourth directional axis DR4 and the fifth directional axis DR5 may intersect the first to third directional axes DR1, DR2 and DR3. However, the directions indicated by the first to fifth directional axes DR1 to DR5 are relative concepts and are not limited to the illustration of FIG. 7A.

FIG. 7A illustrates a bending display device including the bending areas BA disposed at opposing sides of the non-bending area NBA, respectively. However, embodiments of the invention are not limited thereto. In an alternative embodiment, the display device may be a bending display device including a single non-bending area and a single bending area. In such an embodiment, the bending area may be bent from only one side of the non-bending area.

In an embodiment of the display device EA-a, a window WP-1 may include the bending area BA and the non-bending area NBA. A base substrate BS-1 may include at least one bending area BA. The printed layer BM may be disposed on a surface of the base substrate BS-1. The printed layer BM may overlap with the bending area BA.

The adhesive layer AP and the display module DM may be coupled to the window WP-1 to correspond to the bending area BA and the non-bending area NBA.

In an embodiment, the adhesive layer AP may include a first adhesive portion AP1 which overlaps with the non-display area NAA of the display panel DP in the bending area BA. In such an embodiment, the adhesive layer AP may include a second adhesive portion AP2 which is adjacent to the first adhesive portion AP1 and has different creep value and modulus value from those of the first adhesive portion AP1.

The second adhesive portion AP2 may include a first sub-adhesive portion AP2-S1 not overlapping with the printed layer BM, and a second sub-adhesive portion AP2-S2 disposed between the first adhesive portion AP1 and the first sub-adhesive portion AP2-S1. The first adhesive portion AP1, the second sub-adhesive portion AP2-S2 and a portion of the first sub-adhesive portion AP2-S1 may overlap with the bending area BA.

In an embodiment, the first adhesive portion AP1 adjacent to the edge E-AP of the adhesive layer AP may be provided or formed from a preliminary adhesive portion having a relatively small creep value and a relatively high modulus value, and thus the first adhesive portion AP1 may inhibit or prevent a void (e.g., gas or air) from permeating from the outside into the adhesive layer AP. In such an embodiment, the second adhesive portion AP2 provided or formed from a preliminary adhesive portion having a relatively large creep value and a relatively low modulus value may overlap with the edge E-BM of the printed layer BM and may effectively cover a step difference portion of the printed layer BM. Thus, a lifting phenomenon of the adhesive layer AP may be minimized. In such an embodiment, high adhesive strength may be maintained at a portion of the second adhesive portion AP2, which overlaps with the bending area BA and is thus bent.

An embodiment of the display device may include the adhesive layer in which the mechanical property value of the adhesive portion adjacent to the edge exposed to the outside is improved, and thus the display device may have improved reliability. In an embodiment of the display device, the portion of the adhesive layer which is adjacent to the edge exposed to the outside may include the adhesive portion provided or formed from the preliminary adhesive portion having the relatively small creep value and the relatively high modulus value. Thus, a void (e.g., gas or air) provided from the outside may be blocked by the adhesive layer, and high adhesive characteristics between the adhesive layer and the components of the display device may be maintained. As a result, the reliability of the display device may be improved.

Figure 8:
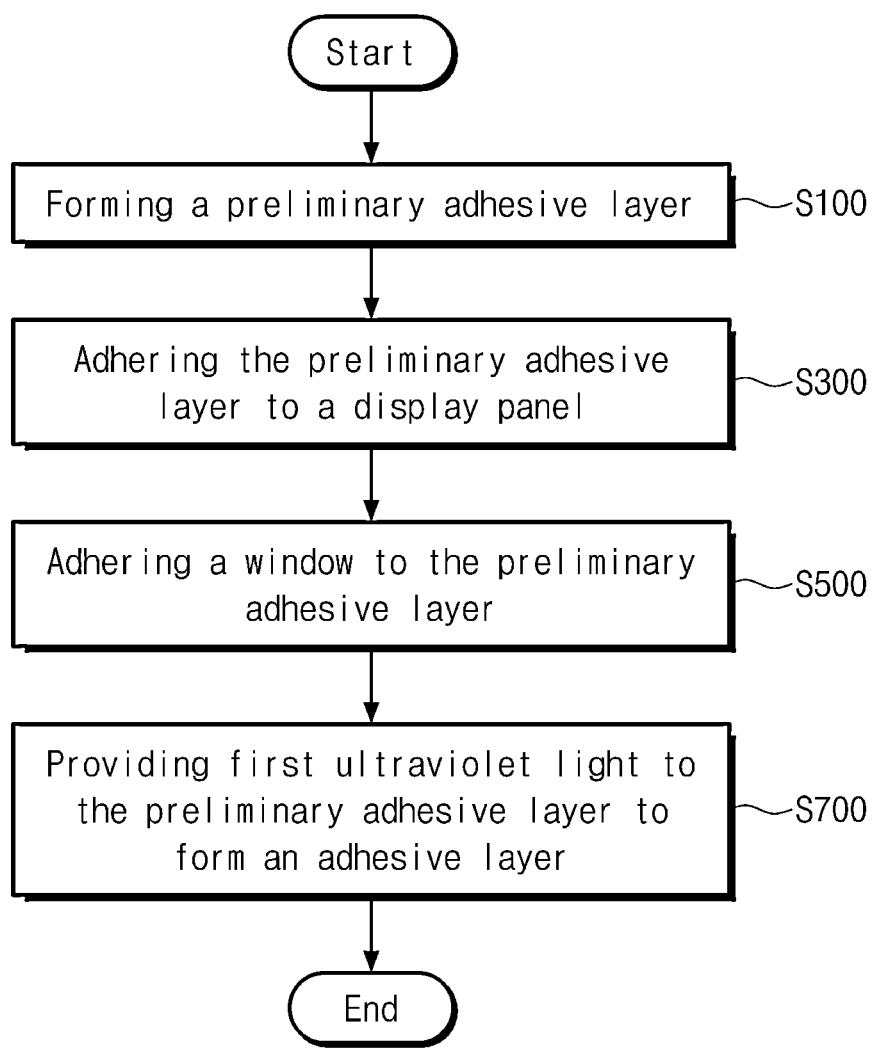
FIG. 8 is a flowchart illustrating a method for manufacturing a display device according to an embodiment of the invention.
Figure 9A:
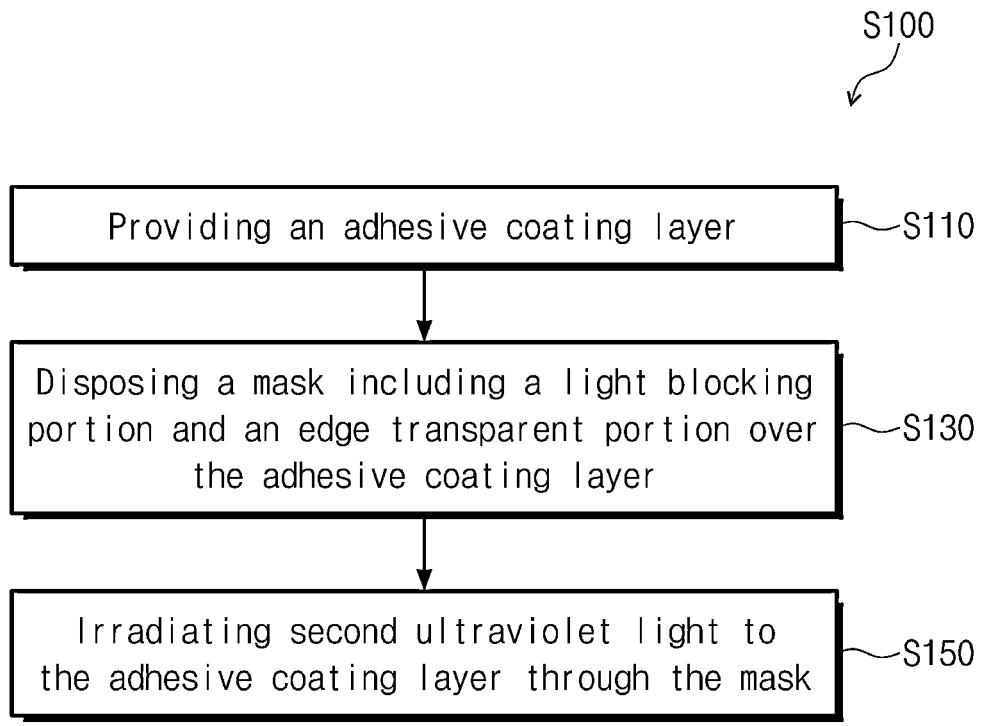
FIG. 9A is a flowchart illustrating a step of a method for manufacturing a display device according to an embodiment of the invention.
Figure 9B:
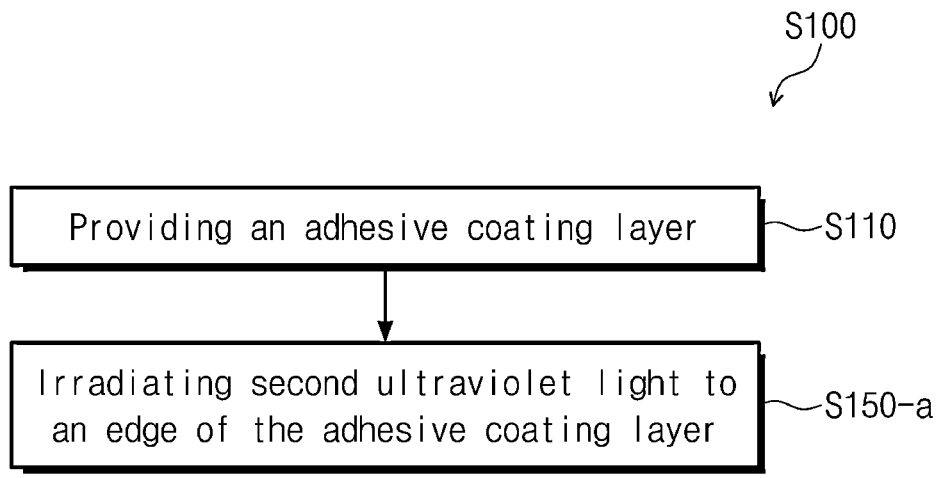
FIG. 9B is a flowchart illustrating a step of a method for manufacturing a display device according to an embodiment of the invention.

Hereinafter, an embodiment of a method for manufacturing a display device will be described with reference to FIGS. 8 to 10D. FIG. 8 is a flowchart illustrating a method for manufacturing a display device according to an embodiment of the invention. FIGS. 9A and 9B are flowcharts illustrating some steps of a method for manufacturing a display device according to an embodiment of the invention. FIGS. 10A to 10D are schematic views illustrating a method for manufacturing a display device according to an embodiment of the invention. FIGS. 11A and 11B are graphs showing changes in creep value of a preliminary adhesive layer.

In an embodiment, a method for manufacturing a display device may include forming a preliminary adhesive layer (S100), adhering the preliminary adhesive layer to a display panel (S300), adhering a window to the preliminary adhesive layer (S500), and providing first ultraviolet light to the preliminary adhesive layer to form an adhesive layer (S700).

The forming of the preliminary adhesive layer (S100) may include providing an adhesive coating layer (S110), disposing a mask including a light blocking portion and an edge transparent portion over the adhesive coating layer (S130), and irradiating second ultraviolet light to the adhesive coating layer through the mask (S150).

Figure 10A:
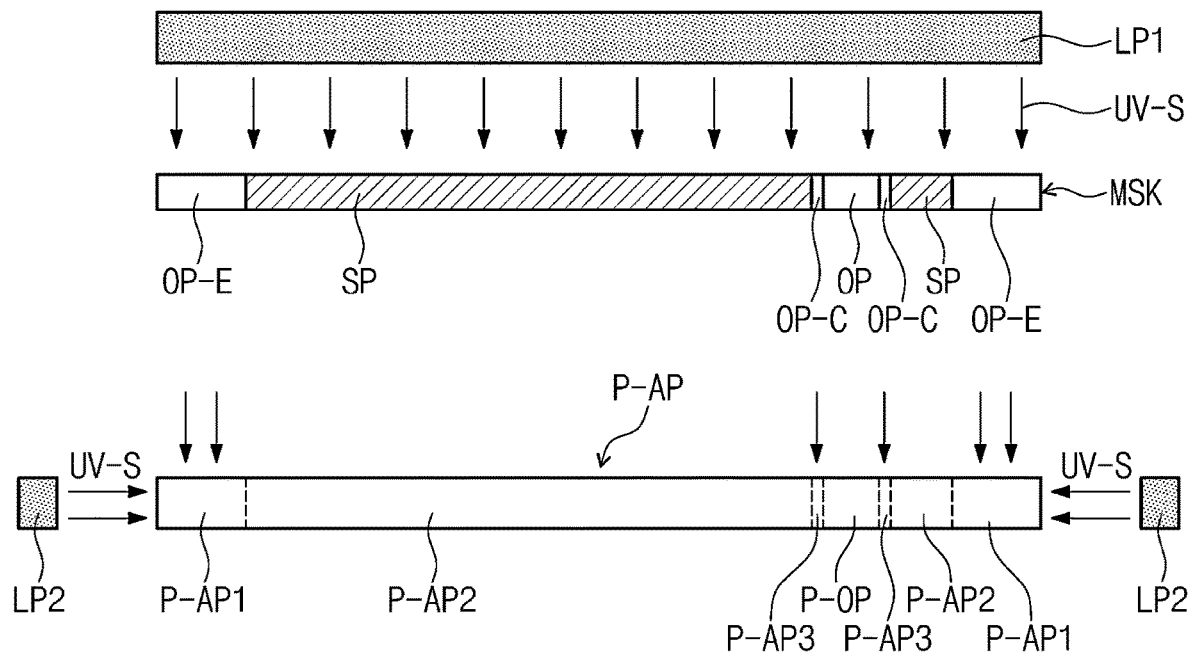
FIGS. 10A to 10D are schematic views illustrating a method for manufacturing a display device according to an embodiment of the invention.
Figure 11A:
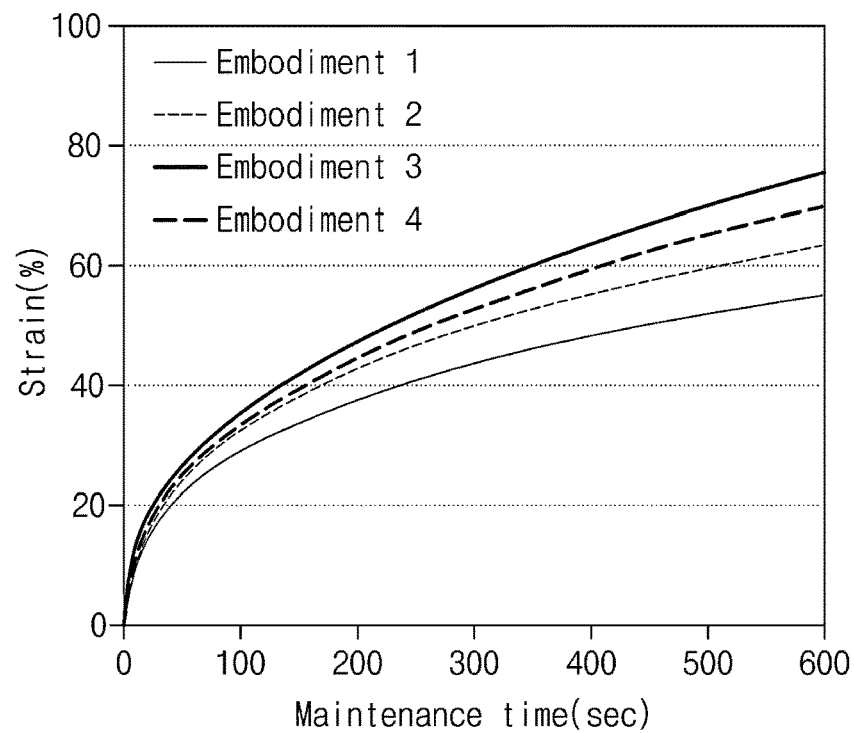
FIGS. 11A and 11B are graphs showing changes in creep value of a preliminary adhesive layer.
Figure 11B:
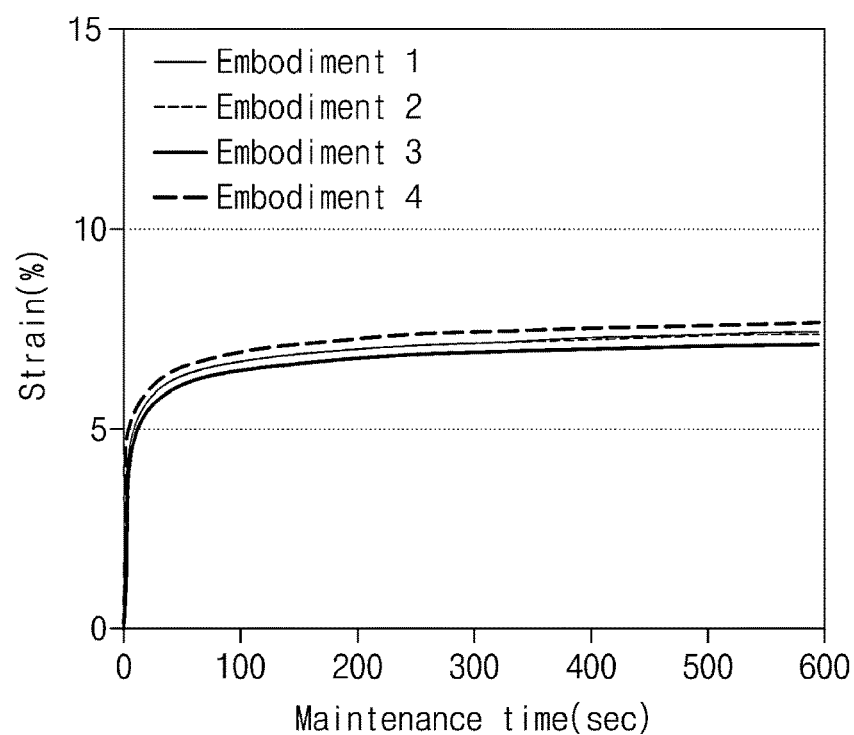

FIG. 10A may illustrate the forming of the preliminary adhesive layer (S100). Referring to FIG. 10A, a mask MSK used in the forming of the preliminary adhesive layer P-AP may include an edge transparent portion OP-E and a light blocking portion SP. The edge transparent portion OP-E may overlap with a portion of the non-display area NAA of the display panel DP (see FIG. 3). The light blocking portion SP may overlap with the display area AA of the display panel DP (see FIG. 3). In such an embodiment, the light blocking portion SP may also overlap with a portion of the non-display area NAA. The light blocking portion SP may be adjacent to the edge transparent portion OP-E. The light blocking portion SP may be disposed between the edge transparent portions OP-E. In such an embodiment, the mask MSK may include a hole open portion OP overlapping with the module hole MH (see FIG. 6) and a hole transparent portion OP-C surrounding the hole open portion OP.

The second ultraviolet light UV-S provided from a light source LP1 may be transmitted through the mask MSK and then may be provided to the adhesive coating layer, and the adhesive coating layer may be cured by the second ultraviolet light UV-S to form a preliminary adhesive layer P-AP. The light source LP1 may include a metal halide lamp. The second ultraviolet light UV-S provided from the light source LP1 may have a central (or peak) wavelength in a wavelength range of about 250 nanometers (nm) to about 400 nm.

The adhesive coating layer may include an adhesive composition. The adhesive composition may include at least one of an acrylic-based adhesive resin, a silicon-based adhesive resin, or a urethane-based adhesive resin. The adhesive composition may include an uncured oligomer or monomer. The uncured oligomer or monomer may include a crosslinking reactive group. In an embodiment, the adhesive composition may include an initiator and a crosslinker. The initiator may be a thermal initiator or a photoinitiator.

In the preliminary adhesive layer P-AP, a first preliminary adhesive portion P-AP1 may be a portion of the adhesive coating layer, which is cured by the second ultraviolet light UV-S transmitted through the edge transparent portion OP-E of the mask MSK. In the preliminary adhesive layer P-AP, a second preliminary adhesive portion P-AP2 may be a portion overlapping with the light blocking portion SP of the mask MSK. The light blocking portion SP of the mask MSK may block the second ultraviolet light UV-S, and thus the second preliminary adhesive portion P-AP2 may not be exposed to the second ultraviolet light UV-S. Accordingly, a hardness of the second preliminary adhesive portion P-AP2 may be lower than that of the first preliminary adhesive portion P-AP1. In such an embodiment, the light blocking portion SP may block the whole of the second ultraviolet light UV-S, or a transmittance of the light blocking portion SP to the second ultraviolet light UV-S may be lower than a transmittance of the edge transparent portion OP-E to the second ultraviolet light UV-S. Thus, the amount of the uncured oligomer or monomer in the second preliminary adhesive portion P-AP2 may be more than the amount of the uncured oligomer or monomer in the first preliminary adhesive portion P-AP1.

The adhesive composition may be provided in a liquid state, and the adhesive coating layer may be a liquid coating layer before the second ultraviolet light UV-S is provided. The adhesive coating layer in the liquid state may be converted into the preliminary adhesive layer P-AP, which includes the first and second preliminary adhesive portions P-AP1 and P-AP2 having different hardnesses from each other, by the second ultraviolet light UV-S provided through the mask MSK. In an alternative embodiment, the adhesive coating layer may be a solid coating layer including an uncured monomer or oligomer. The adhesive coating layer of the solid coating layer may be converted into the preliminary adhesive layer P-AP, which includes the first and second preliminary adhesive portions P-AP1 and P-AP2 having different hardnesses from each other, by the second ultraviolet light UV-S provided through the mask MSK. During such a process, the uncured monomer or oligomer may remain in the second preliminary adhesive portion P-AP2.

The second preliminary adhesive portion P-AP2 may have a creep value greater than that of the first preliminary adhesive portion P-AP1. A ratio of a first creep value of the first preliminary adhesive portion P-AP1 to a second creep value of the second preliminary adhesive portion P-AP2 may be in a range from 0.1:1 to 0.5:1. The first creep value of the first preliminary adhesive portion P-AP1 and the second creep value of the second preliminary adhesive portion P-AP2 may be values obtained after providing the second ultraviolet light UV-S to the adhesive coating layer.

FIGS. 11A and 11B are graphs showing creep properties of the first preliminary adhesive portion P-AP1. FIG. 11A shows creep properties of the adhesive coating layer corresponding to the first preliminary adhesive portion P-AP1 before the second ultraviolet light UV-S is irradiated, and FIG. 11B shows creep properties of the first preliminary adhesive portion P-AP1 after the second ultraviolet light UV-S is irradiated. In FIGS. 11A and 11B, embodiments 1 to 4 are embodiments obtained by changing a composition of the adhesive resin of the components of the adhesive composition for forming the adhesive coating layer.

The creep properties shown in FIGS. 11A and 11B are results of evaluation of shear creep properties. The creep properties in FIGS. 11A and 11B show results obtained by measuring strain values using a rheometer (DHR-G2). Herein, the creep values are compared using the strain values.

A sample of the shear creep evaluation was prepared by disposing a preliminary adhesive layer sample having a thickness of 900 μm between two SUS substrates, each of which has a thickness of 8 millimeters (mm). The preliminary adhesive layer was formed by irradiating ultraviolet light of 3000 millijoule per square centimeters (mJ/cm$^2$) to the adhesive composition. The strain shows a change when a load (or strength) of 2000 Pa was uniformly applied to the evaluation sample for 10 minutes.

Referring to the results of FIGS. 11A and 11B, the strain of the first preliminary adhesive portion P-AP1 after irradiating the ultraviolet light is much lower than the strain of the first preliminary adhesive portion P-AP1 to which the ultraviolet light is not irradiated. In one embodiment, for example, the strain of the first preliminary adhesive portion P-AP1 before irradiating the second ultraviolet light UV-S was 55.6% to 75.8% after 10 minutes. The strain of the first preliminary adhesive portion P-AP1 after irradiating the second ultraviolet light UV-S was 7.2% to 7.7% after 10 minutes. Accordingly, a ratio of a creep value of the first preliminary adhesive portion P-AP1 cured by the second ultraviolet light UV-S to a creep value before the first preliminary adhesive portion P-AP1 is cured by the second ultraviolet light UV-S may be in a range from 0.1:1 to 0.5:1.

The ratio of the creep values of the first and second preliminary adhesive portions P-AP1 and P-AP2 of the preliminary adhesive layer P-AP of FIG. 10A may be deduced from the results of FIGS. 11A and 11B. More particularly, the creep value of the second preliminary adhesive portion P-AP2 having a relatively low hardness by the light blocking portion SP blocking the second ultraviolet light UV-S may be greater than the creep value of the first preliminary adhesive portion P-AP1 cured by the second ultraviolet light UV-S transmitted through the edge transparent portion OP-E of the mask MSK. Accordingly, a hardness of the first preliminary adhesive portion P-AP1 cured by the second ultraviolet light UV-S may be higher than that of the second preliminary adhesive portion P-AP2, and a modulus value of the first preliminary adhesive portion P-AP1 may be higher than that of the second preliminary adhesive portion P-AP2.

The ratio of the creep value of the first preliminary adhesive portion P-AP1 to the creep value of the second preliminary adhesive portion P-AP2 may be in a range from 0.1:1 to 0.5:1. As an irradiation amount of the second ultraviolet light UV-S provided through the edge transparent portion OP-E increases, the creep value of the first preliminary adhesive portion P-AP1 may decrease and the modulus value of the first preliminary adhesive portion P-AP1 may increase.

In an embodiment of the method for manufacturing the display device, the preliminary adhesive layer P-AP may include the first preliminary adhesive portion P-AP1 having the first creep value and the second preliminary adhesive portion P-AP2 having the second creep value greater than the first creep value.

Referring to FIG. 10A, as described above, the mask MSK may include the hole open portion OP overlapping with the module hole MH and the hole transparent portion OP-C adjacent to the hole open portion OP. The hole transparent portion OP-C may surround the hole open portion OP. In an embodiment, as shown in FIG. 10A, the hole open portion OP is illustrated as a portion through which the second ultraviolet light UV-S is transmitted, like the edge transparent portion OP-E. However, embodiments of the invention are not limited thereto. In an alternative embodiment, the hole open portion OP may block the whole or a portion of the second ultraviolet light UV-S, like the light blocking portion SP.

The preliminary adhesive layer P-AP may further include a third preliminary adhesive portion P-AP3 corresponding to the hole transparent portion OP-C. The third preliminary adhesive portion P-AP3 may be a portion of the adhesive coating layer, which is cured by the second ultraviolet light UV-S transmitted through the hole transparent portion OP-C of the mask MSK. A ratio of a third creep value of the third preliminary adhesive portion P-AP3 to the second creep value of the second preliminary adhesive portion P-AP2 may be in a range from 0.1:1 to 0.5:1. In such an embodiment, a hardness of the third preliminary adhesive portion P-AP3 cured by the second ultraviolet light UV-S may be higher than that of the second preliminary adhesive portion P-AP2, and a modulus value of the third preliminary adhesive portion P-AP3 may be higher than that of the second preliminary adhesive portion P-AP2.

A preliminary adhesive hole P-OP of the preliminary adhesive layer P-AP, which corresponds to the hole open portion OP of the mask MSK, may be a portion removed in a subsequent process of assembling a display device. The preliminary adhesive hole P-OP may be a portion corresponding to the adhesive layer hole MH-AP (see FIG. 5).

In an embodiment, as shown in FIG. 10A, the adhesive coating layer may be additionally cured by second ultraviolet light UV-S emitted from a side light source LP2 disposed adjacent to a side surface of the adhesive coating layer. The second ultraviolet light UV-S emitted from the side light source LP2 may be provided to the adhesive coating layer to form the first preliminary adhesive portion P-AP1. In an embodiment, the second ultraviolet light UV-S may be provided simultaneously or sequentially from the light source LP1 disposed over the mask MSK and the side light source LP2 disposed adjacent to the side surface of the adhesive coating layer. The first preliminary adhesive portion P-AP1 may be a portion cured by the second ultraviolet light UV-S provided to the side surface and may have a modulus value higher than that of the second preliminary adhesive portion P-AP2. In such an embodiment, the second preliminary adhesive portion P-AP2, the hardness of which is relatively low due to a small irradiation amount of the second ultraviolet light UV-S, may have the creep value greater than that of the first preliminary adhesive portion P-AP1.

In an embodiment, as shown in FIG. 10A, the light sources for providing the second ultraviolet light UV-S may include the light source LP1 disposed over the mask MSK and the side light source LP2 as described above. However, in an alternative embodiment, the side light source LP2 may be omitted.

In another alternative embodiment, the second ultraviolet light UV-S may be provided from only the side light source LP2. In such an embodiment, the light source LP1 of FIG. 10A for providing the second ultraviolet light UV-S over the mask MSK may be omitted. In such an embodiment, the forming of the preliminary adhesive layer (S100) may include providing an adhesive coating layer (S110), and irradiating second ultraviolet light to an edge of the adhesive coating layer (S150-a), as illustrated in FIG. 9B.

Figure 10B:
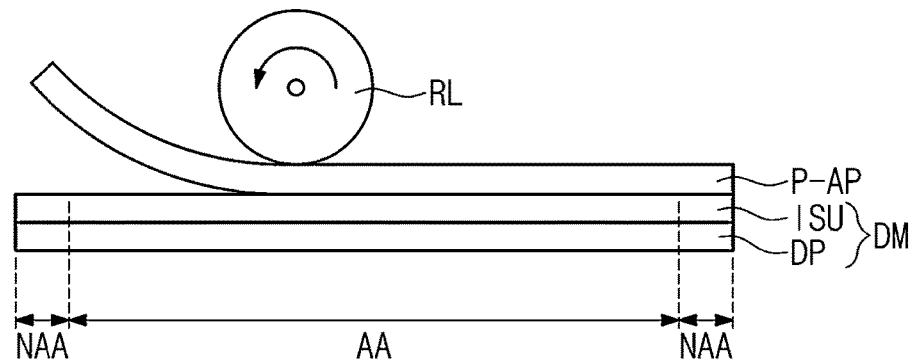

FIG. 10B schematically illustrates the adhering of the preliminary adhesive layer to the display panel (S300). One surface of the preliminary adhesive layer P-AP may face the display panel DP. The preliminary adhesive layer P-AP may include the first preliminary adhesive portion P-AP1 and the second preliminary adhesive portion P-AP2, which have different mechanical properties from each other.

In an embodiment, as shown in FIG. 10B, the preliminary adhesive layer P-AP is adhered to the display module DM. In an embodiment, the preliminary adhesive layer P-AP may be adhered to the input sensing unit ISU of the display module DM. In an embodiment, when the preliminary adhesive layer P-AP is adhered to the display module DM, the one surface of the preliminary adhesive layer P-AP may be adhered to the display module DM while applying constant pressure by using a roller RL.

Figure 10C:
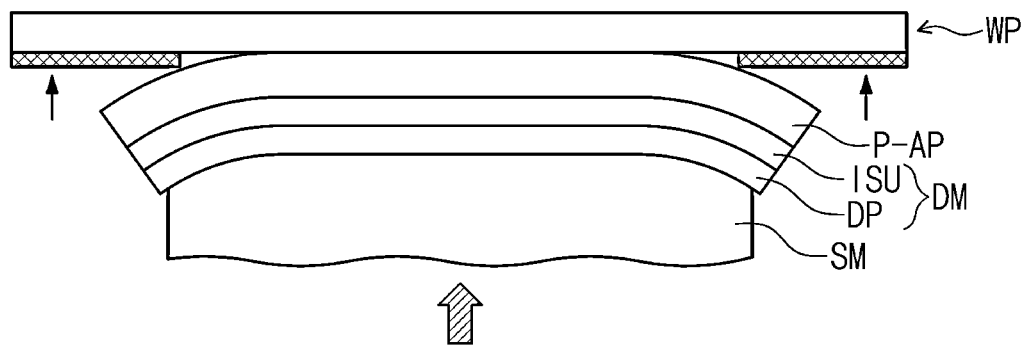

FIG. 10C schematically illustrates the adhering of the window to the preliminary adhesive layer (S500). FIG. 10C illustrates a state in which a portion of the preliminary adhesive layer P-AP is adhered to the window WP. Referring to FIG. 10C, another surface of the preliminary adhesive layer P-AP, which is opposite to the one surface adhered to the display module DM, may be adhered to the window WP. In such an embodiment, when the preliminary adhesive layer P-AP is adhered to the window WP, a pressing pad SM may be used. In one embodiment, for example, the pressing pad SM may be a silicon pad. To stably adhere the preliminary adhesive layer P-AP to the window WP, predetermined pressure may be provided to the display module DM, to which the preliminary adhesive layer P-AP is adhered, by using the pressing pad SM. Thus, an edge portion of the preliminary adhesive layer P-AP may also be stably adhered to the window WP.

In an embodiment, even though not shown in the drawings, the method for manufacturing a display device may further include removing a void using an autoclave apparatus after the adhering the window to the preliminary adhesive layer (S500). The void provided in the process of adhering the preliminary adhesive layer P-AP may be additionally removed using the autoclave apparatus.

Figure 10D:
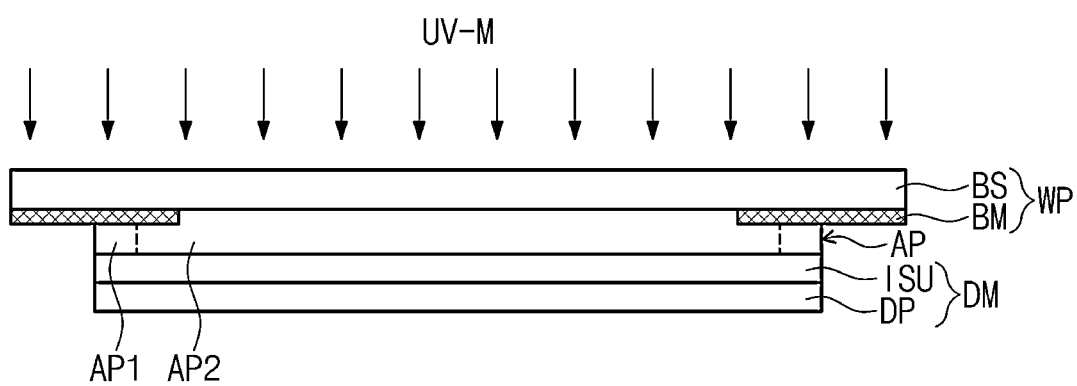

FIG. 10D schematically illustrates the providing of the first ultraviolet light to the preliminary adhesive layer to form the adhesive layer (S700). After the preliminary adhesive layer P-AP is adhered between the window WP and the display module DM, the first ultraviolet light UV-M may be provided to the preliminary adhesive layer P-AP through the window WP to convert the preliminary adhesive layer P-AP into the adhesive layer AP. A hardness of the adhesive layer AP may be increased as compared with that of the preliminary adhesive layer P-AP. A modulus value of the adhesive layer AP may be greater than that of the preliminary adhesive layer P-AP.

In an embodiment, the adhesive layer AP may include a first adhesive portion AP1 and a second adhesive portion AP2. The first adhesive portion AP1 may be provided or formed from the first preliminary adhesive portion P-AP1, and the second adhesive portion AP2 may be provided or formed from the second preliminary adhesive portion P-AP2. In such an embodiment, the first ultraviolet light UV-M may be provided to the preliminary adhesive layer P-AP including the first and second preliminary adhesive portions P-AP1 and P-AP2, and thus unreacted monomers or unreacted oligomers included in the first and second preliminary adhesive portions P-AP1 and P-AP2 may react with the initiator and the crosslinker to form the adhesive layer AP including the first and second adhesive portions AP1 and AP2.

The first ultraviolet light UV-M may have a central wavelength in a wavelength range of 250 nm to 400 nm. The wavelength of the first ultraviolet light UV-M may be equal to or different from the wavelength of the second ultraviolet light UV-S.

In an embodiment, modulus values of the first and second adhesive portions AP1 and AP2 finally cured by the first ultraviolet light UV-M may be different from each other. In such an embodiment, depending on a process condition of the providing of the first ultraviolet light to the preliminary adhesive layer to form the adhesive layer (S700), the modulus value of the first adhesive portion AP1 may be greater than the modulus value of the second adhesive portion AP2, or the modulus value of the second adhesive portion AP2 may be greater than the modulus value of the first adhesive portion AP1.

The modulus values of the first and second adhesive portions AP1 and AP2 finally cured by the first ultraviolet light UV-M were measured using a bioindenter (UNHT3 Bio, Anton-Paar company). The following table 1 shows a modulus value of the adhesive coating layer uncured before irradiating ultraviolet light, a modulus value of the first adhesive portion pre-cured by the second ultraviolet light UV-S and then finally cured by the first ultraviolet light UV-M, and a modulus value of the second adhesive portion cured by the first ultraviolet light UV-M without pre-curing. Referring to the following table 1, after finally curing the pre-cured portion and the non-pre-cured portion by using the first ultraviolet light UV-M, the modulus values of the pre-cured portion and the non-pre-cured portion are different from each other. A used adhesive composition is the sample of the embodiment 2 of FIGS. 11A and 11B.

When measuring the modulus values, a material of the used indenter was a ruby, and a tip having a globular shape and a diameter of 500 μm was used. The modulus values were measured at room temperature. After applying a load of 500 micronewton (μN) onto the adhesive layer (i.e., the sample) for 2 minutes, a degree of restoration of the sample was evaluated.

In the following table 1, samples 1 to 5 correspond to different kinds of the adhesive layer samples using the same adhesive composition. The adhesive layer samples correspond to different portions of the display device. The sample 1 corresponds to a vicinity of the module hole, the samples 2 and 3 correspond to portions adjacent to a short side of the display device, and the samples 4 and 5 correspond to portions adjacent to a long side of the display device.

TABLE 1

| Classification | Modulus (kPa) of adhesive coating layer | Modulus (kPa) of first adhesive portion | Modulus (kPa) of second adhesive portion |
| --- | --- | --- | --- |
| Sample 1 | 167.8 | 306.5 | 338.1 |
| Sample 2 | 171.3 | 299.4 | 334.7 |
| Sample 3 | 167.3 | 300.3 | 332.4 |
| Sample 4 | 164.4 | 301.8 | 330.6 |
| Sample 5 | 169.1 | 305.2 | 334.3 |
| Average | 168.0 | 302.6 | 334.0 |

Referring to the table 1, the first adhesive portion AP1 provided or formed from the first preliminary adhesive portion P-AP1 pre-cured may have a modulus value lower than that of the second adhesive portion AP2 provided or formed from the second preliminary adhesive portion P-AP2 not pre-cured. In other words, the first adhesive portion AP1 and the second adhesive portion AP2 have different modulus values in the finally cured state.

However, the evaluated results of the modulus values of the table 1 are merely exemplary. Unlike the table 1, the first adhesive portion AP1 may have a modulus value higher than that of the second adhesive portion AP2 in the finally cured state.

In an embodiment of the method for manufacturing a display device, when the preliminary adhesive layer is provided to couple the display module and the window, the preliminary adhesive layer may include the first and second preliminary adhesive portions having different mechanical properties from each other. Thus, a coupling strength between the display module and the window may be maintained, and it is possible to inhibit or prevent a void (e.g., gas or air) from being diffused from the outside into the adhesive layer. As a result, the display device with improved reliability may be provided.

According to embodiments of the invention, the display device may include the adhesive layer including the first adhesive portion corresponding to a portion adjacent to the edge of the display module and the second adhesive portion corresponding to the display area of the display module. In such embodiments, the mechanical properties of the first and second adhesive portions may be different from each other. Thus, the reliability of the display device may be improved.

According to embodiments of the invention, the method for manufacturing a display device may include pre-curing a portion of the preliminary adhesive layer provided to the display module, and thus adhesive strength between the display module and the window may be effectively maintained and the display device with improved reliability may be provided.

While the invention have been described with reference to example embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. A method for manufacturing a display device, the method comprising:
   forming a preliminary adhesive layer, wherein the preliminary adhesive layer comprises: a first preliminary adhesive portion having a first creep value; and a second preliminary adhesive portion having a second creep value greater than the first creep value, wherein each of the first and second creep values is a creep value obtained under a same condition that a load of 2000 Pa is maintained at 50 degrees Celsius for 10 minutes;
   adhering the preliminary adhesive layer to a display panel including a display area and a non-display area;
   adhering a window to the preliminary adhesive layer; and
   providing first ultraviolet light to the preliminary adhesive layer to form an adhesive layer, wherein the forming the preliminary adhesive layer comprises:

providing an adhesive coating layer including an adhesive composition;

disposing a mask over the adhesive coating layer, wherein the mask includes an edge transparent portion overlapping with the non-display area and a light blocking portion adjacent to the edge transparent portion; and irradiating second ultraviolet light to the adhesive coating layer through the mask.

2. The method of claim 1, wherein a ratio of the first creep value to the second creep value is in a range from 0.1:1 to 0.5:1.

3. The method of claim 1, wherein the first preliminary adhesive portion corresponds to the edge transparent portion of the mask, and the second preliminary adhesive portion corresponds to the light blocking portion of the mask.

4. The method of claim 1, wherein a module hole is defined in the display area of the display panel, and wherein the mask further includes a hole open portion corresponding to the module hole, and a hole transparent portion surrounding the hole open portion.

5. The method of claim 4, wherein the preliminary adhesive layer further comprises a third preliminary adhesive portion corresponding to the hole transparent portion, and wherein a ratio of a third creep value of the third preliminary adhesive portion to the second creep value is in a range from 0.1:1 to 0.5:1, and each of the second creep value and the third creep value is a creep value obtained under the same condition that a load of 2000 Pa is maintained at 50 degrees Celsius for 10 minutes.

6. The method of claim 1, wherein the forming the preliminary adhesive layer comprises:

providing an adhesive coating layer including an adhesive composition; and irradiating second ultraviolet light to an edge of the adhesive coating layer.

7. The method of claim 1, wherein the adhesive layer comprises:

a first adhesive portion provided from the first preliminary adhesive portion; and a second adhesive portion provided from the second preliminary adhesive portion.

8. The method of claim 7, wherein the first adhesive portion and the second adhesive portion have different modulus values from each other.

* * * * *